United States Patent [19]

Bortolin et al.

[11] Patent Number: 5,216,106
[45] Date of Patent: Jun. 1, 1993

[54] METHOD OF MAKING SILETHYNYL POLYMERS

[75] Inventors: Roberto Bortolin, Bordeaux, France; Scott S. D. Brown; Bhukandas Parbhoo, both of Barry, Wales

[73] Assignee: Dow Corning Limited, Barry, Wales

[21] Appl. No.: 636,174

[22] Filed: Dec. 31, 1990

[30] Foreign Application Priority Data

Jan. 8, 1990 [GB] United Kingdom ............... 9000387

[51] Int. Cl.$^5$ ............................................. C08G 77/60
[52] U.S. Cl. ................................ 528/34; 526/279; 528/12; 528/14; 528/32
[58] Field of Search ................... 528/32, 14, 34; 556/478; 526/279

[56] References Cited

U.S. PATENT DOCUMENTS 3,699,140 10/1972 Chandra et al. .
4,866,153 9/1989 Bortolin ......................... 528/32

FOREIGN PATENT DOCUMENTS 0217539 8/1986 European Pat. Off. .
914935 1/1963 United Kingdom .
2204041 11/1988 United Kingdom .

OTHER PUBLICATIONS

Odian, G., "Principles of Polymerization", 3d Ed., 467 (1991), Wiley (New York).
Miller, M. L., "The Structures of Polymers", 2d Printing, 437, 458-9 (1968) Reinhold (New York).
66448q—Chemical Abstract, Voronkov et al, USSR, 1973, 42(6), pp. 1408-1409.
67034u—Chemical Abstract, Preparation of ethynylsilanes, J. Organometal Chem. 1970, 21(1), pp. 83-90.

*Primary Examiner*—Joseph L. Schofer
*Assistant Examiner*—Fred Zitomer
*Attorney, Agent, or Firm*—James E. Bittell

[57] ABSTRACT

A method of making silethynyl polymers having units of the general formula —($R_2SiC \equiv C$)— wherein each R independently denotes a hydrogen atom, an alkyl, aryl or alkenyl group or a substituted alkyl, aryl or alkenyl group having up to 18 carbon atoms comprises adding a lithium salt of one or more diethynylsilanes of the general formula $R_2Si(C \equiv CH)_2$ to one or more dihalosilanes of the general formula $R_2SiX_2$ where X is a halogen atom and allowing the components to react. Copolymers with alternating units can be made. Linear polymers are made preferentially. Limiting the use of solvent increases the percentage of linear polymers produced.

13 Claims, No Drawings

METHOD OF MAKING SILETHYNYL POLYMERS

This invention relates to a method of making silethynyl polymers, particularly copolymers with alternating units, and also of improving the yield of linear silethynyl polymers whether homopolymers or copolymers are produced.

Linear silethynyl polymers have been known for some time and have been described for example in G.B. Patent Specification 914 935. These polymers have repeating units of the general formula $-(Y_2SiC\equiv C)-$, wherein Y may be a saturated, ethylenically unsaturated or aromatic hydrocarbon group. The polymers of G.B. Specification 914 935 have been prepared by reacting an organodifluoro silane with an alkali metal acetylide.

In G.B. Patent Application 2 204 041 a method is described for the preparation of cyclic silethynyl polymers having at least 4 silicon atoms per molecule. This method comprises the reaction of a lithium salt of one or more diethynylsilanes with one or more dihalosilanes. In the examples a dichlorosilane solution in tetrahydrofuran was slowly added to a solution of the lithium salt of a diethynylsilane, producing mainly cyclic silethynyl polymers. When copolymers are made according to the method of G.B. Patent Application 2 204 041 the different units of the polymer are randomly distributed throughout the polymers.

We have now found that in the production of copolymers having an equal number of two different silethynyl units the reaction product has an alternating sequence of said silethynyl units if the order of adding the reagents described in G.B. Patent Specification 2 204 041 is reversed. We have also found that reversing the addition order of reagents results in a higher yield of linear silethynyl polymers compared with the method of the prior art.

According to the invention there is provided a method of making silethynyl polymers having units of the general formula $-(R_2SiC\equiv C)-$ wherein each R independently denotes a hydrogen atom, an alkyl, aryl or alkenyl group or a substituted alkyl, aryl or alkenyl group having up to 18 carbon atoms, which comprises adding a lithium salt of one or more diethynylsilanes of the general formula $R_2Si(C\equiv CH)_2$ to one or more dihalosilanes of the general formula $R_2SiX_2$, wherein R is as defined above and X is a halogen atom and allowing the components to react.

The lithium salt of a diethynylsilane has the general formula $R_2Si(C\equiv CLi)_2$ and can be prepared by reacting a diethynylsilane with an alkyllithium compound for example butyl lithium. Such reaction is carried out by mixing the ingredients and is preferably carried out in the presence of a solvent comprising tetrahydrofuran, aromatic hydrocarbon, aliphatic hydrocarbon or an ether solvent. Diethynylsilanes may themselves be obtained for example by reacting a dihalosilane of the general formula $R_2SiX_2$ with $HC\equiv CMgCl$ in tetrahydrofuran. The R substituent of the lithium salt may be hydrogen, alkyl for example methyl, ethyl, hexyl, dodecyl or octadecyl, aryl for example phenyl or napthyl, alkenyl for example vinyl, allyl or hexenyl or substituted groups such as halogenated alkyl, tolyl or styryl. Preferably the R substituents are alkyl or aryl, most preferably methyl or phenyl. Each R substituent may be different or the same as the other R substituent.

The dihalosilane reactants are known substances, many of which are commercially available. Preferably the dihalosilane is a dichlorosilane. The other substituents of the dihalosilane may be hydrogen, alkyl for example methyl, ethyl, hexyl, dodecyl or octadecyl, aryl for example phenyl or napthyl, alkenyl for example vinyl, allyl or hexenyl, or substituted groups such as halogenated alkyl, tolyl or styryl. Preferably these substituents are alkyl or aryl. The most preferred dihalosilanes are dimethyldichlorsilane, diphenyldichlosorilane and methylphenyldichlorosilane.

The polymers produced by the method of the invention may be linear or a mixture of cyclic and linear polymers. Cyclic polymers have the general formula $[R_2SiC\equiv C]_n$ wherein n is an integer. Linear polymers have the average formula $R''-[R_2SiC\equiv C]_n-R_2SiR''$ wherein n is an integer, R is as defined above and R'' is selected from R, $-C\equiv CH$, $-OR$, $-X$ and $-OH$ wherein X is halogen. This type of terminating units is produced depending on the reaction condition and/or solvents used. Preferably R'' denotes $-R$ or $-C\equiv CH$.

The choice of diethynylsilanes and dihalosilanes will determine the silethynyl polymers produced. The diethynylsilane which is used to form the lithium salt may be represented by the general formula $R^0R^1Si(C\equiv CH)_2$, the dihalosilane by the general formula $R^2R^3SiX_2$. If $R^0$, $R^1$, $R^2$ and $R^3$ are all the same or a combination of $R^0$ and $R^1$ is the same as the combination of $R^2$ and $R^3$ the copolymers produced will be homopolymers. By choosing silanes in which the combination of $R^0$ and $R^1$ is different from the combination of $R^2$ and $R^3$ or by choosing mixtures of two or more different diethynylsilanes and/or dihalosilanes, silethynyl polymers are produced which are copolymers having two or more different units.

If, for example $R^0$, $R^1$, $R^2$ and $R^3$ are all methyl groups, mainly linear dimethylsilethynyl polymers are produced. The reaction of the lithium salt of dimethyldiethynylsilane with methylphenyldichlorosilane, according to the invention, will result in a silethnyl polymer having some units with two methyl substituents on the silicon atom and some units with a methyl and phenyl substituent on the silicon atom. Examples of preferred copolymers are those wherein $R^0$, $R^1$, $R^2$ and $R^3$ are respectively methyl, methyl, phenyl and phenyl, methyl, methyl methyl and phenyl or methyl, phenyl, phenyl and phenyl. If a mixture of silanes is used. e.g. a mixture of diphenyldichlorosilane and phenylmethyldichlorosilane the addition of a lithium salt of e.g. dimethyldiethynylsilane would result in a terpolymer having some units with two methyl groups attached to a silicon atom, some with a methyl and a phenyl group attached and some with two phenyl groups attached. A person skilled in the art will immediately understand that numerous combinations of silethynyl units can be achieved in a copolymer by using the method of this invention.

Polymers are made by using as reagents stoichiometric amounts of a diethynylsilane and a dihalosilane, i.e. one diethynylsilane for every dihalosilane. If only one type of each silane is used the method of this invention will provide a copolymer having an alternating sequence of units and not a random distribution, as was the case in the prior art. This is true for both linear copolymers and cyclic copolymers produced. The invention accordingly provides a method of making silethynyl copolymers having alternating units of the general formulae $-(R^0R^1SiC\equiv C)-$ and $-(R^2R^3SiC\equiv C)-$ wherein each $R^0$, $R^1$, and $R^3$ independently denotes a hydrogen atom, an alkyl, aryl or alkenyl group or a substituted alkyl, aryl or alkenyl group having up to 18 carbon atoms, provided that the combination $R^0$ and $R^1$ is different from the combination $R^2$ and $R^3$ which comprises adding a lithium salt of a diethynylsilane of the general formula $R^0R^1Si(C\equiv CH)_2$ to a dihalosilane of the general formula $R^2R^3SiX_2$ wherein X is a halogen atom and allowing the component to react.

It is preferred that in the method of the invention the lithium salt is made of those silanes which, having regard to the silicon-bonded substituents, are the strongest nucleophile. This means that if one wants to make a silethynyl copolymer having alternating units of the form $—(R^0R^1SiC\equiv C)—$ and units of the form $—(R^2R^3SiC\equiv C)—$ one will choose to use the lithium salt of the silane which is the strongest nucleophile, i.e. either $R^0R^1Si(C\equiv CLi)_2$ or $R^2R^3Si(C\equiv CLi)_2$ whilst the weaker nucleophile of $R^0R^1SiX_2$ or $R^2R^3SiX_2$ will be used as the halosilane. This means for example that in order to make a silethynyl polymer in which $R^0$ and $R^1$ are methyl groups and $R^2$ and $R^3$ are phenyl groups, one will preferably add the lithium salt of dimethyldiethynyl silane to diphenyldichlorosilane and not the lithium salt of diphenyldiethynylsilane to dimethyldichlorosilane.

When producing silethynyl polymers according to the method of this invention it is particularly important to control the order of addition. It is found to be necessary to add the lithium salt only gradually to the dihalosilane. It is believed, although the applicant does not wish to be bound by this theory, that the gradual addition is necessary in order to ensure that the dihalosilane should be present in stoichiometric excess during the reaction. The stronger the nucleophilic character of the lithium salt of the diethynylsilane the more the speed of addition can be increased. The speed of addition of the lithium salt depends to some extent on the efficiency of agitation as it is preferred to maintain an excess of the dihalosilane at all times, even on a microscale, i.e. in the immediate neighbourhood of the incoming lithium salt of the diethynylsilane. Addition speeds can be increased according to the efficiency of the dispersion of the incoming lithium salts. For a small scale operation typically such addition speed will be in the order of 0.01 ml/minute to 10 ml/minute, preferably 0.1 to 0.5 ml/minute.

Low molecular weight cyclic polymers are believed to be formed by rearrangement of the growing polymers, probably under the influence of lithium organosilicon species as rearrangement catalysts. By ensuring the dihalosilanes are present in stoichiometric excess it is believed that the formation of these lithium-organosilicon compounds, and thus the rearrangement reaction, is slower than the formation of the lithium halogen salts. Only towards the end of the addition of the lithium salt of diethynylsilane will the excess of dihalosilanes be so small that a small proportion of rearrangement will be possible. The propounded theory may explain why the method of the invention tends to produce a larger amount of linear silethynyl polymers than the prior art method.

The reaction is preferably carried out in the presence of some solvent. The solvent may be the same or different from the solvent used in the production of the lithium salt of the diethynyl silane. The reaction can advantageously be carried out immediately after producing the lithium salts and the solvent added together with the lithium salt. Additional solvent may be added to the dihalosilane. We have further found that by reducing the amount of solvent used in the method of the invention a better yield of linear polymers is obtained, regardless of the substituents on the silicon atoms.

The temperature at which the reaction is carried out is not critical. The reaction may be carried out at or below ambient temperature or at elevated temperatures. Preferably the reaction is performed at a temperature in the range from about 15° to 30° C. The method of the invention can provide high yields even when the reaction is carried out at ambient temperature (about 20° C.). If desired the reaction time may be reduced by the use of elevated temperatures.

If all R groups are methyl groups, mainly linear silethynyl polymers are obtained which have the general formula $R'—[(CH_3)_2SiC\equiv C]_n—Si(CH_3)_2$ $R'$ wherein each $R'$ is selected from $—C\equiv CH$, $—CH_3$, $—OCH_3$, $—X$ and $—OH$ where X is a halogen atom and n is an integer. If not all R groups are methyl groups a mixture of linear and cyclic materials are formed. The linear materials have the general formula $R''—[RH_2SiC\equiv C]_n—SiR_2R''$ wherein R and n are as defined above and $R''$ denotes $—C\equiv CH$, OH, X, R or OR. Because performing the method of the invention in a reduced amount of solvent increases the yield of linear polymers, it is preferred to keep the amount of solvent used in the method of the invention to a minimum if linear homopolymers or copolymers are desired.

When the reaction is complete the polymers may be recovered from the reaction mixture, for example by precipitation in an alcohol such as methanol followed by filtration or solvent evaporation. Linear polymers thus obtained tend to be high viscosity materials which are usually solids or waxy materials. They are relatively high molecular weight materials wherein the value of n can have any value, but is generally between 8 and 250, mostly around 40.

The invention provides in another of its aspects silethynyl polymers and silethynyl copolymers which are produced according to the method of the invention.

Silethynyl polymers obtained by the method of this invention are believed to have useful optical and electronic properties arising from their electron-rich nature. The polymers may be used for example as semiconductor materials or in waveguide technology. Due to the presence of the acetylenic unsaturation the polymers may also serve as intermediates for further reaction, for example addition reaction with compounds having siliconbonded hydrogen atoms. The latter compounds may e.g. bear certain functional groups which would thus be linked to the polymers produced by the method of the invention.

There now follow a number of examples in which all parts and percentages are expressed by weight.

EXAMPLES

A 2.85 molar solution or butyllithium in hexane (86.9 mmol) was added to a solution of $A_2Si(C\equiv CH)_2$ (43.5 mmol) in 50ml of tetrahydrofuran cooled to $-78°$ C. The resulting solution was stirred at ambient temperature for two hours and transferred to a dropping funnel. The solution of $A_2Si(CH\equiv CLi)_2$ was added at a rate of 0.1 to 0.5 ml per minute to a solution of $Y_2SiCl_2$ (43.5 mmol) in 50 ml tetrahydrofuran at ambient temperature and stirred for two hours. This solution was then added to 200 ml of a saturated solution of $NH_4Cl$ in water. The organic phase was separated, washed with brine and dried over $Na_2SO_4$. After filtration the solvent was evaporated to give a solid which was washed with methanol, filtered and dried under vacuum, resulting in a 95% yield of the theoretical value which is due to the inaccuracy in the stoichiometry of the added reagents. The resulting compounds were studied and analysed by super-critical fluid chromatography and nuclear magnetic resonance using $C^{13}$ and $Si^{29}$ isotopes. The A and Y groups and the characterisation of the resulting compounds are given in the Table below where Me denotes a methyl group and Ph a phenyl group. Comparative experiments, denoted by a C in front of the Example number, were performed using the method of G.B. Specification 2 204 041 and the results are also shown in the Table.

TABLE

| Example | A | Y | % Linear By Volume | Molecular Weight |
|---------|-------|-------|--------------------|------------------|
| 1 | Me | Me | >90* | N/A |
| C1 | Me | Me | 0* | Cyclic |
| 2 | Ph | Ph | 85 | 4100 |
| C2 | Ph | Ph | 60 | 3400 |
| 3$^a$ | Ph | Ph | 98 | 2900 |
| 4 | Me | Ph | 60–77 | 4560 |
| C4 | Me | Ph | 60 | 3600 |
| 5+ | Ph/Me | Ph/Me | 87 | N/A |
| C5+ | Ph/Me | Ph/Me | 70 | 2600 |

*estimated value
$^a$performed in the presence of a minimum amount of solvent only
+one of each of the A and Y substituents was Ph the other Me It becomes clear that the method of the invention yields a higher percentage of linear silethynyl polymers than the prior art method and that reducing the amount of solvent used to a minimum increases this percentage even more. The polymer of Example 4 had alternating units di-Me silethynyl and di-Ph silethynyl.

That which is claimed is:

1. A method of making silethynyl polymers having units of the general formula $-(R_2SiC\equiv C)-$ wherein each R is independently selected from the group consisting of hydrogen, alkyl groups having up to 18 carbon atoms, aryl groups having up to 18 carbon atoms alkenyl groups having up to 18 carbon atoms, substituted alkyl groups having up to 18 carbon atoms, substituted aryl groups having up to 18 carbon atoms, and substituted alkenyl groups having up to 18 carbon atoms, which comprises adding a lithium salt of one or more diethynylsilanes of the general formula $R_2Si(C\equiv CH)_2$ to one or more dihalosilanes of the general formula $R_2SiX_2$, where the lithium salt is added to maintain a stoichiometric excess of the dihalosilane to the lithium salt, R is as defined above, and X is a halogen atom and allowing the components to react.

2. A method according to claim 1 wherein each R is independently selected from the group consisting of alkyl groups having up to 18 carbon atoms and aryl groups having up to 18 carbon atoms.

3. A method according to claim 1 wherein each R is independently selected from methyl and phenyl.

4. A method of making silethynyl copolymers having alternating units of the general formulae $-(R^0R^1SiC\equiv C)-$ and $-(R^2R^3SiC\equiv C)-$ wherein each $R^0$, $R^1$, $R^2$ and $R^3$ independently denotes a group R as defined above provided that the combination $R^0$ and $R^1$ is different from the combination $R^2$ and $R^3$, which comprises adding a lithium salt of a diethynylsilane of the general formula $R^0R^1Si(C\equiv CH)_2$ to a dihalosilane of the general formula $R^2R^3SiX_2$ wherein X is a halogen atom and allowing the components to react.

5. A method according to claim 4 wherein $R^0$ and/or $R^1$ are a stronger nucleophile than $R^2$ and/or $R^3$.

6. A method according to claim 4 wherein each of $R^1$, $R^2$ and $R^3$ is independently selected from the group consisting of alkyl groups having up to 18 carbon atoms and aryl groups having to 18 carbon atoms.

7. A method according to claim 4 wherein each of $R^0$, $R^1$, $R^2$ and $R^3$ independently denotes a methyl or a phenyl group.

8. A method according to claim 1 wherein X denotes a chlorine atom.

9. A method according to claim 1 wherein the components are allowed to react in the presence of a solvent.

10. A method according to claim 1 wherein the components are allowed to react at a temperature of from 15° to 30° C.

11. A method according to claim 4 wherein X denotes a chlorine atom.

12. A method according to claim 4 wherein the components are allowed to react in the presence of a solvent.

13. A method according to claim 4 wherein the components are allowed to react at a temperature of from 15° to 30° C.

* * * * *